United States Patent [19]

Nash

[11] Patent Number: 4,772,033
[45] Date of Patent: Sep. 20, 1988

[54] FLEXIBLE DUCT JOINT UTILIZING LIP IN RECESS IN A FLANGE

[75] Inventor: Dudley O. Nash, Cincinnati, Ohio

[73] Assignee: General Electric Company, Cincinnati, Ohio

[21] Appl. No.: 536,606

[22] Filed: Sep. 28, 1983

[51] Int. Cl.[4] .............................................. F16J 15/16
[52] U.S. Cl. .................................... 277/174; 285/263; 239/265.35
[58] Field of Search ......................... 277/174; 285/263; 239/265.35, 455; 464/133, 173

[56] References Cited

U.S. PATENT DOCUMENTS

| | | | |
|---|---|---|---|
| 2,846,242 | 8/1958 | Drake | 285/263 |
| 3,046,736 | 7/1962 | Thomson | 60/35.55 |
| 3,056,615 | 10/1962 | Breitenstein | 285/263 X |
| 3,165,339 | 1/1965 | Faccou | 285/263 |
| 3,232,642 | 2/1966 | Cleff et al. | 285/263 X |
| 3,233,834 | 2/1966 | Cottrell et al. | 239/265.35 |
| 3,504,903 | 4/1970 | Irwin | 267/1 |
| 3,570,768 | 3/1971 | Conway et al. | 239/265.35 |
| 3,799,586 | 3/1974 | Caras et al. | 285/98 |
| 4,108,381 | 8/1978 | Sottosanti et al. | 239/265.35 |
| 4,311,313 | 9/1982 | Vedova et al. | 277/27 |
| 4,448,449 | 5/1984 | Halling et al. | 285/263 |

FOREIGN PATENT DOCUMENTS

| | | | |
|---|---|---|---|
| 2360534 | 6/1974 | Fed. Rep. of Germany | 285/263 |
| 992297 | 5/1965 | United Kingdom | 285/263 |

Primary Examiner—Robert S. Ward
Attorney, Agent, or Firm—Derek P. Lawrence

[57] ABSTRACT

A flexural joint for connecting opposing ends of first and second annular ducts. The joint includes a lip which extends outwardly from the first duct and a flange member which extends outwardly from the second duct. The flange member contains a recess which is adapted to engage the lip.

3 Claims, 1 Drawing Sheet

FLEXIBLE DUCT JOINT UTILIZING LIP IN RECESS IN A FLANGE

This invention relates generally to flexible duct joints and, more particularly, to means for flexibly mounting an exhaust duct to an engine casing in an aircraft engine.

BACKGROUND OF THE INVENTION

Present turbojet engines are precision machines capable of efficiently delivering the large thrust required by today's aircraft. In order to achieve ever increasing thrust and performance demands, engine blades must rotate at very high speeds and in close proximity to stationary components. Rigidity in such components is necessary to avoid undue rubbing by the blades and the resulting engine performance deterioration. These stationary components are held in fixed relationship through the engine casing. In order to keep the engine casing rigid, bending moments therein must be minimized.

The integration of engines to aircraft requires some means of engine mounting. The conventional form of mounting is to support the engine casing at two positions, viz. forward and aft mounts. At least two engine configurations require more complex schemes. Exhaust nozzles which deflect the jet for the purpose of improved flight maneuverability or vertical/short takeoff and landing produce large transverse loads which result in large bending moments in the engine casing.

One solution is to move the aft engine mount nearer to the exhaust nozzle. When this is done, however, the relative distance between the forward and aft engine mounts increases. Under loading conditions, such as flight maneuvers or landings, this increased casing span between mounts will cause the engine casing to deflect. Although it may be possible to install a third engine mount, the result is to tie the engine to the supporting airframe structure so that the engine bends with the airframe. Alternatively, the engine casing could be reinforced to resist bending moments, but this results in an unacceptable weight increase.

A second engine configuration that presents engine mounting problems involves extended length exhaust nozzles. These nozzles attach to the rear of the engine casing and produce bending moments by their cantilever action. In addition to bending moments induced by such exhaust nozzles, undesirable clearance between the nozzle and airframe is necessary to allow for exhaust nozzle deflection.

One solution to the above-referenced problems has been to provide a third engine mount towards the aft end of the exhaust nozzle and attach the exhaust nozzle to the engine casing with a flexible joint. In effect, the engine casing and exhaust nozzle are separately mounted with bending moments eliminated by the flexible joint. A typical flexible joint employs a bellows for flexible motion between casing and nozzle in combination with either a single axis trunnion or gimbal type joint for providing support for shear loads and axial loads. These joints tend to be heavy and generally bulky.

OBJECTS OF THE INVENTION

It is an object of the present invention to provide a new and improved flexural joint.

It is a further object of the present invention to provide a new and improved lightweight flexural joint between engine casing and exhaust nozzle in an aircraft engine.

Another object of the present invention is to provide a new and improved flexural joint which permits both torsional and transverse motion.

SUMMARY OF THE INVENTION

A flexural joint in accordance with the present invention connects opposing ends of first and second annular ducts. The joint comprises a lip extending outwardly from the first duct and a flange member extending outwardly from the second duct. The flange member includes a recess therein which is adapted to engage the lip.

In one specific form of the present invention a flexural joint for connecting the forward end of an annular exhaust duct to the aft end of an annular engine casing in an aircraft engine is disclosed. The joint comprises an outwardly extending circumferential lip connected to the casing aft end and angled away from the exhaust duct forward end. The joint further comprises an outwardly extending, circumferential, fixed flange portion connected to the exhaust duct forward end. The fixed flange portion includes a generally forward facing wall. In addition, the joint comprises a removable flange portion connected to the fixed flange portion by fastening means. The removable flange portion includes a generally aft facing wall. The forward facing wall and aft facing wall define a recess therebetween which is adapted to engage the lip. The walls and lip are generally contained within concentrically spherical surfaces.

DETAILED DESCRIPTION OF THE INVENTION

Figure 1:
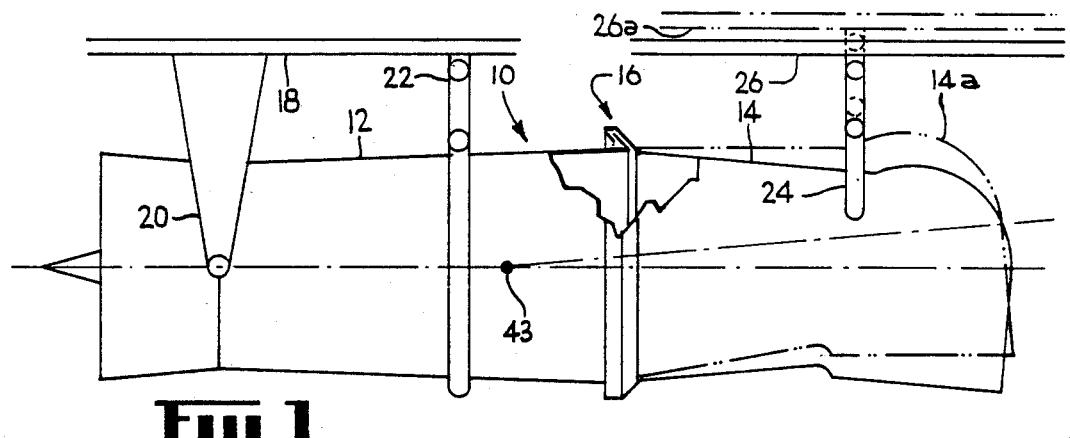
FIG. 1 shows a schematic view of a mounting arrangement for engine casing and exhaust duct with a flexural joint according to one form of the present invention.

FIG. 1 illustrates a typical mounting system for an aircraft turbine engine 10 employing the present invention. The outer shell of engine 10 comprises generally two parts, namely, engine casing 12 and exhaust duct 14. These are joined by flexural joint 16, which is shown in greater detail in FIGS. 2-4. Both engine casing 12 and exhaust duct 14 are generally annular in the vicinity of flexural joint 16. It will be evident that the invention herein described applies not only to turbojet aircraft engines but equally to flexible joints between any two annular ducts.

Engine casing 12 is mounted to airframe 18 through forward engine mount 20 and center engine mount 22. As shown, forward mount 20 is a side or trunnion-type mount and center mount 22 is a link-type mount. Although the particular type of mount arrangement can vary, two mounts are considered necessary and sufficient to provide proper support and avoid bending induced by deflections in the airframe. Exhaust duct 14 is attached to the aircraft by means of aft mount 24. In one application, aft mount 24 is attached to wing structure 26. Wing structure 26a represents its elastic deflection relative to the more rigid structure 18. In practice, aft mount 24 may be any conventional mounting means, as for example a trunnion or yoke-type mount. As wing structure 26 deflects, exhaust duct 14 moves in response thereto. For example, phantom line 14a shows an off-axis position of exhaust duct 14. By the use of flexural joint 16, this motion of exhaust duct 14 should not be transmitted to engine casing 12.

Figures 2, 3:
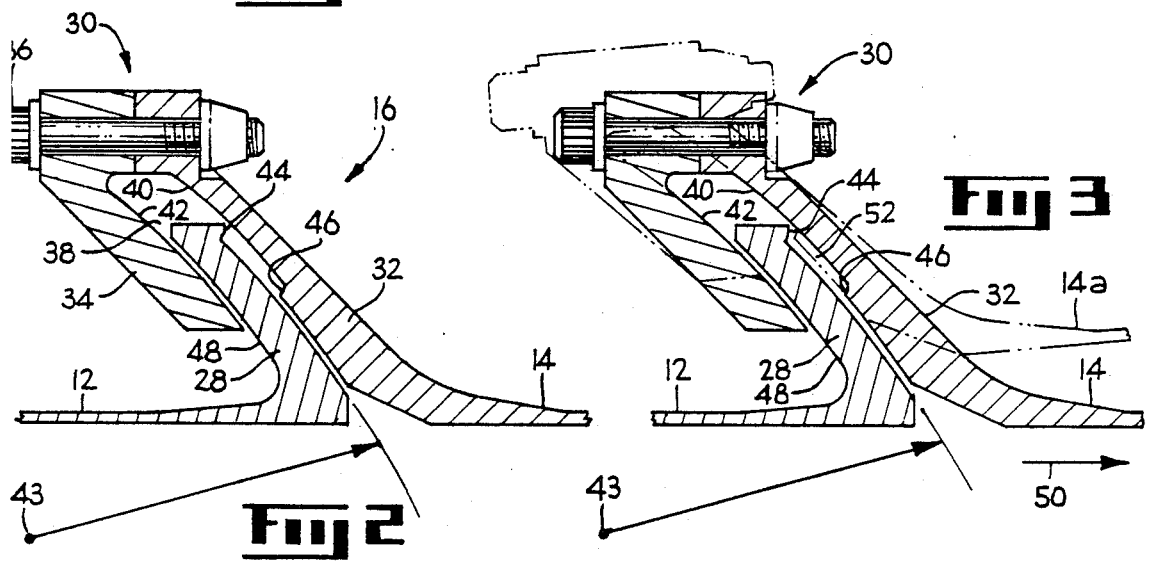
FIG. 2 shows a cross-sectional side view of the flexural joint according to one form of the present invention.
FIG. 3 shows a cross-sectional side view of the motion of the flexural joint of FIG. 2.
Figure 4:
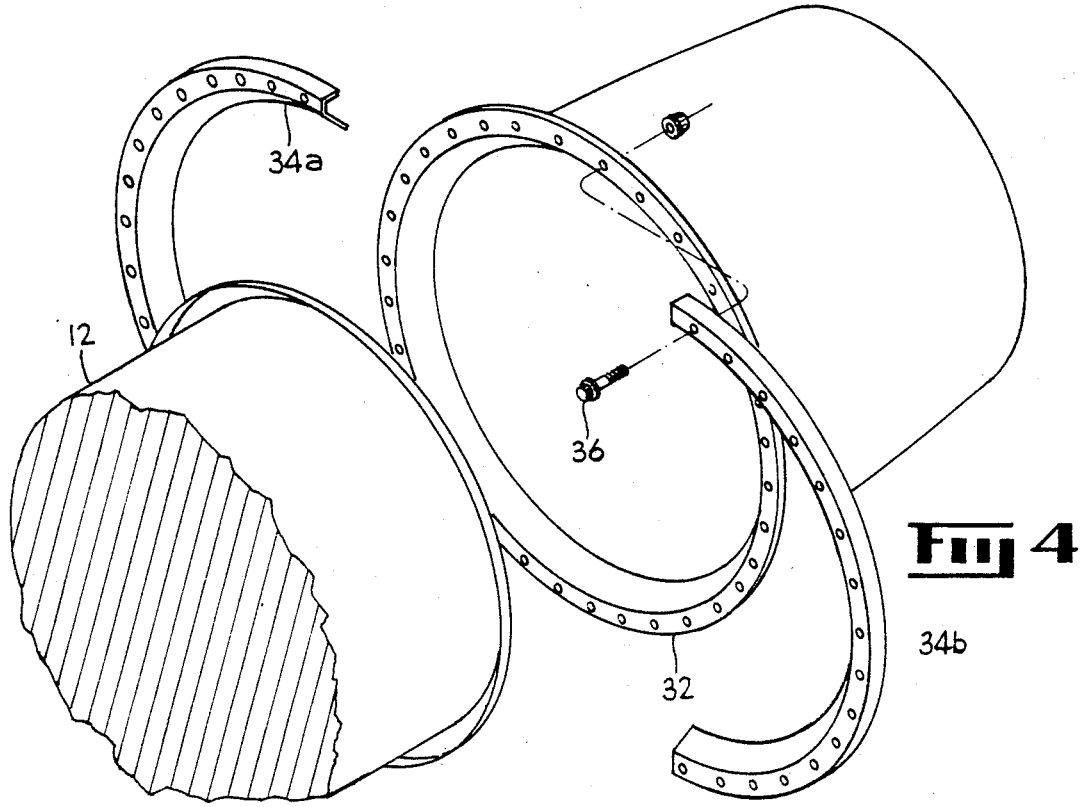
FIG. 4 shows an exploded perspective view of the flexural joint of FIG. 2.

FIG. 2 illustrates in greater detail flexural joint 16 shown in FIG. 1. A lip 28 is formed on the aft end of engine casing 12 and extends outwardly from casing 12 and is angled away from exhaust duct 14. A flange member 30 is formed on the forward end of exhaust duct 14 and extends outwardly from exhaust duct 14. Flange member 30 may include fixed flange portion 32 and removable flange portion 34. For added clarity, FIG. 4 shows in an exploded, perspective view the flexural joint 16 illustrated in FIG. 1. In one embodiment, removable flange portion 34 is a split ring comprising two parts 34a and 34b. Flange portion 34 is split for ease of installation but it could be a single piece depending upon the application. Removable flange portion 34 is connected to fixed flange portion 32 by fastening means, as for example bolts 36. Each bolt 36 extends through matching holes in removable flange portion 34 and fixed flange portion 32.

Flange member 30, as shown in FIG. 2, includes a recess 38 which is adapted to receive and engage lip 28. Recess 38 is bounded in part by a generally forward facing wall 40 of fixed flange portion 32 and a generally aft facing wall 42 of removable flange portion 34. Both walls 40 and 42 as well as wall 48 of lip 28 are generally spherical with the center of rotation 43 being located generally along the engine center line. Put another way, walls 40 and 42 and wall 48 are generally contained within concentrically spherical surfaces with center 43.

Recess 38 engages lip 28 by wall 48 generally contacting wall 42 in a manner to be described more fully hereinafter. The axial location of center 43 will determine the curvature of walls 40 and 42 and lip 28. In practice, a balance must be struck between large radii which provide good axial strength but are weak in shear strength, and small radii which provide good shear strength but are weak in transmitting axial loads. It should be clear that radial length is determined by the axial location of center 43. Thus, as center 43 moves axially forward the radius will increase. Although FIG. 2 shows lip 28 angled away from exhaust duct 14, it is within the scope of the invention to have lip 28 angle towards exhaust duct 14. Moreover, lip 28 and flange member 30 may be reversed with lip 28 being formed on the forward end of exhaust duct 14 and flange member 30 being formed on the aft end of engine casing 12.

In one embodiment, lip 28 includes a protrusion 44 which generally extends towards wall 40. Fixed flange portion 32 includes a ledge 46 which faces lip 28. Together, protrusion 44 and ledge 46 form an interlocking structure, the operation of which will be described more fully hereinafter. In order to facilitate the relative motion between lip 28 and flange member 30, a low friction lining, such as Teflon, may be applied to either or both of walls 42 and 48.

In operation, flexural joint 16 is capable of transmitting axial loads as well as permitting sufficient degrees of both torsional and angular deflection of exhaust duct 14 relative to engine casing 12. FIG. 3 illustrates the operation of flexural joint 16 resulting from the partial angular deflection of exhaust duct 14. As duct 14 deflects upwardly to a position shown by broken line 14a, flange member 30 rotates on the spherical surface of wall 42 about point 43 while maintaining sliding contact with the spherical surface of wall 48. By such rotation, bending moments which would otherwise be transmitted to engine casing 12 are eliminated. Thus, engine casing 12 remains relatively unaffected by angular deflections.

Protrusion 44 on lip 28 serves as a positive stop for flange member 30 as ledge 46 on fixed flange portion 32 rotates to meet it. In addition to serving as a stop, protrusion 44 serves to prevent accidental disengagement of the joint resulting from severe impact.

Exhaust duct 14 is also capable of torsional rotation, not shown, relative to casing 12. Due to the spherical shape of walls 42 and 48, such rotation may occur by itself or concurrently with the above-described angular deflection of flange member 30. Axial loads on exhaust duct 14 tend to be in the aft direction indicated by arrow 50. Axial loads will be transmitted through flange member 30 so that wall 42 bears on lip wall 48. In so doing protrusion 44 will be drawn towards wall 40. In order to avoid excessive friction and possible binding, clearance is provided between protrusion 44 and wall 40 by means of depression 52 in the forward facing surface of fixed flange portion 32.

Although it is preferred to have spherically shaped walls 42 and 48, it is within the scope of the invention to include generally linear cross section wall geometries. In other words, walls 42 and 48 lie within adjacent conical surfaces. In such a case, torsional motion is relatively unaffected, whereas angular deflection may be slightly inhibited.

It will be clear to those skilled in the art that the present invention is not limited to the specific embodiments described and illustrated herein. Nor is the invention limited to flexural joints between engine casing and exhaust ducts in gas turbine engines. Rather, applications include flexible connections between any two annular ducts.

It will be understood that the dimensions and proportional and structural relationships shown in the drawings are illustrated by way of example only and those illustrations are not to be taken as the actual dimensions or proportional structural relationships used in the flexural joint of the present invention.

Numerous modifications, variations, and full and partial equivalents can be undertaken without departing from the invention as limited only by the spirit and scope of the appended claims.

What is desired to be secured by Letters Patent of the United States is the following:

What is claimed is:

1. In an aircraft engine, a flexural joint for connecting the forward end of an annular exhaust duct having an axis to the aft end of an annular engine casing comprising:

a circumferential lip extending outwardly from the axis and connected to said aft end and angled away from said forward end, said lip including a first wall;

a, circumferential, fixed flange portion outwardly extending from the axis and connected to said forward end, said fixed flange portion including a generally forward facing wall;

a removable flange portion connected to said fixed flange portion by fastening means, said removable flange portion including a generally aft facing wall;

wherein said forward facing wall and said aft facing wall define the aft and forward extent, respectively, of a recess therebetween, said recess being adapted to engage said lip with said first wall contacting said aft facing wall and wherein said aft facing wall and said first wall are generally contained within concentrically spherical surfaces.

2. The flexural joint, as recited in claim 1, wherein said lip includes a protrusion generally extending towards said forward facing wall and wherein said forward facing wall includes a ledge against which said protrusion may abut thereby retaining said lip within said recess.

3. The flexural joint, as recited in claim 1, wherein at least said first wall or said flange aft facing wall includes a low friction lining thereon.

* * * * *